(12) United States Patent
Burdick

(10) Patent No.: US 8,404,365 B2
(45) Date of Patent: Mar. 26, 2013

(54) PAPER FOR GYPSUM WALLBOARD

(75) Inventor: Charles L. Burdick, Landenberg, PA (US)

(73) Assignee: Hercules Incorporated, Wilmington, DE (US)

( * ) Notice: Subject to any disclaimer, the term of this patent is extended or adjusted under 35 U.S.C. 154(b) by 1484 days.

(21) Appl. No.: 11/726,411

(22) Filed: Mar. 22, 2007

(65) Prior Publication Data

US 2007/0246178 A1 Oct. 25, 2007

Related U.S. Application Data

(60) Provisional application No. 60/785,325, filed on Mar. 23, 2006.

(51) Int. Cl.
 B32B 9/06 (2006.01)
 B32B 19/06 (2006.01)
 B32B 13/00 (2006.01)
(52) U.S. Cl. .......... 428/701; 428/703; 156/60; 156/349; 52/302.1
(58) Field of Classification Search .................. None
 See application file for complete search history.

(56) References Cited

U.S. PATENT DOCUMENTS

| | | | | |
|---|---|---|---|---|
| 1,871,731 A | * | 8/1932 | Offutt | 428/496 |
| 3,047,523 A | * | 7/1962 | Sullivan et al. | 524/261 |
| 3,663,269 A | | 5/1972 | Fischer et al. | 117/76 |
| 3,918,981 A | * | 11/1975 | Long | 106/16 |
| 4,195,109 A | * | 3/1980 | Long | 428/198 |
| 4,609,431 A | | 9/1986 | Grose et al. | 162/135 |
| 5,160,484 A | | 11/1992 | Nikoloff | 427/439 |
| 6,359,040 B1 | * | 3/2002 | Burdick | 524/43 |
| 6,576,048 B1 | * | 6/2003 | Podlas et al. | 106/172.1 |
| 6,740,395 B2 | * | 5/2004 | Halm et al. | 428/292.4 |
| 6,749,705 B2 | * | 6/2004 | Skrzyniarz et al. | 156/78 |
| 2004/0038065 A1 | * | 2/2004 | Francis et al. | 428/537.7 |
| 2004/0209074 A1 | | 10/2004 | Randall et al. | 428/341 |

FOREIGN PATENT DOCUMENTS

| | | | |
|---|---|---|---|
| DE | 195 28 721 A1 | 8/1994 | |
| DE | 195 31 849 A1 | 8/1994 | 25/4 |
| GB | 1157040 | 2/1968 | 45/4 |
| GB | 1241177 | 7/1971 | |
| WO | 88/03871 | 6/1988 | 13/2 |

OTHER PUBLICATIONS

"A Dictionary of Units of Measurement", http://www.unc.edu/~rowlett/units/dictG.html.*

* cited by examiner

*Primary Examiner* — David Sample
*Assistant Examiner* — Nicole T Gugliotta
(74) *Attorney, Agent, or Firm* — Shaorong Chen; Joanne Mary Fobare Rossi; Michael Herman

(57) ABSTRACT

Paper useful in the manufacture of gypsum wallboard is surfaced treated with an additive to improve the bonding affinity of the paper for wet plaster thereby permitting the manufacture of gypsum wallboard with little or no added starch and reduced amounts of water. A surface treating adhesive, a method of converting the paper and wallboards containing the paper are also described.

15 Claims, No Drawings

PAPER FOR GYPSUM WALLBOARD

RELATED APPLICATIONS

This application claims the benefit of U.S. Provisional Application Ser. No. 60/785,325 filed on Mar. 23, 2006, which is incorporated by reference in its entirety.

FIELD OF THE INVENTION

The present invention relates to a composition useful as an additive in the manufacture of gypsum wallboard that permits the manufacture of wallboards with little or no starch binder. The present invention also relates to paper treated with the additive as well as to a process for manufacturing gypsum wallboard that significantly reduces the quantity of drying energy required as compared to prior art processes. More specifically, the present invention relates to a process for making the paper component of gypsum wallboard with an improved bonding affinity for wet plaster.

BACKGROUND OF THE INVENTION

The gypsum wallboard industry produces wallboard through a process designed to ensure an effective adhesive bond between two external layers of heavy caliper paper that enclose an interior gypsum plaster core. The industry traditionally has added large quantities of starch binder to the plaster core in order to promote adhesion to the paper shell. The industry also adds a large excess of water to the plaster so that, during drying of the plaster between the two paper layers, the excess water can migrate from the wet plaster into the paper carrying starch binder along with it to establish bonding of the plaster to the paper surface. However, such a process is highly energy-intensive due to the amount of drying energy required to migrate and evaporate the excess water from the gypsum plaster core.

There is general industry need for reducing the amount of water used in the production of wallboard since drying costs have increased substantially for the gypsum wallboard producers. It is also apparent that a reduced plaster to water ratio can be attainable with the present invention that can in turn result in a higher strength wallboard. This strength enhancement, attained by including the paper surface treatment in the gypsum wallboard manufacturing process, in turn optionally could allow the production of stronger, low density, wall board products.

It has unexpectedly found that an alternative to the use of starch and high water ratio in the wet plaster core can be practiced and yet still achieve strong bond between the paper layers and the plaster core.

SUMMARY OF THE INVENTION

The present invention relates to a process for making gypsum wallboard by applying a surface treatment to a paper component of the wallboard prior to contacting the paper component with wet plaster to enhance the plaster bond to the paper component. The plaster component can then employ a relatively low amount of water and yet still form a strong bond to this substrate.

The present invention also relates to a composition useful as an additive in the manufacture of gypsum wallboard that permits the manufacture of wallboards with little or no starch binder. The present invention also relates to paper treated with the additive.

Additionally the present invention relates to a wallboard having an interior gypsum plaster core, and at least one treated paper adhered to a surface of the interior gypsum plaster core wherein the paper sheet has a surface treated with a surface treating adhesive. The surface of the interior gypsum plaster core is adhered to the surface of the paper sheet treated with the surface treating adhesive.

The treated paper for use in wallboard contains a paper sheet wherein a surface of the paper sheet is treated with a surface treating adhesive comprised of water and a latex binder. The surface treating adhesive may also contain an amount of a mineral filler. The surface treating adhesive may also contain an amount of a rheology modifier, such as a cellulose ether or a biopolymer or mixtures thereof.

Prior to this invention, the use of high levels of starch and water in gypsum wallboard has been required in order to assure proper bond of the gypsum to the paper component. Generally, the water/plaster ratio has been greater than 70/100 in prior art practice. In the present invention, the water/plaster ratio may be less than 70/100.

This invention has advantages in allowing a reduction in the water/plaster ratio and hence can provide a reduced the energy requirement to make wallboard, and an improved the strength of wall board through use of lower water/plaster ratio. The invention thus represents a process to permit the production of wallboard with improved properties.

DETAILED DESCRIPTION OF THE INVENTION

It was unexpectedly found that a paper shell component of gypsum wallboard can be surface treated with selected materials so as to enhance the bonding tendency of the wallboard's plaster inner core to the paper. This enhanced bonding tendency or affinity in turn allows a plaster core to be formulated with lower water and starch content, which reduces the amount of energy needed to dry the wallboard. Among the advantages of reducing or eliminating the starch content of the plaster core of a wallboard is that the resultant wallboard is potentially less susceptible to microbial attack when exposed to high humidity or other favorable environmental conditions which promote microbial growth.

The present invention relates to a surface treatment adhesive employed as a surface treatment of the paper components of wallboard. This surface treatment adhesive comprises water and a latex binder. The surface treatment adhesive may additionally preferentially comprise a mineral filler. The surface treatment adhesive may also optionally contain such additional ingredients as rheology modifiers, stabilizers and preservatives.

The latex binder component of the surface treatment adhesive is preferred to be in the range of about 1-55 wt % of the surface treatment adhesive. The latex binder component of the surface treatment adhesive may be selected from commonly available latex polymers and may be selected from the group consisting of ethylene polyvinyl acetate, poly(vinyl acetate) (PVOAc)latex, styrene butadiene (SBR), acrylic, vinyl acrylic. Preferably, the latex binder component is ethylene polyvinyl acetate or poly(vinyl acetate) (PVOAc)latex.

The use of the mineral filler in the surface treatment adhesive is optional. If used, the ratio of the mineral filler in the surface treatment adhesive is generally in the range of about 1-50 wt % of the surface treatment adhesive. Many types of minerals and a wide selection of particle size distributions of the mineral filler are possible, although generally finer particle sizes are be preferred for use in the surface treatment adhesive. The mineral filler can include, and may be selected from, the group consisting of calcium sulfate hemi hydrate, calcium sulfate dihydrate, ground gypsum, Portland cement, calcium carbonate, clays, and powdered silica. Other inorganic species may also be of utility as the mineral filler.

Other water-soluble species selected from the group consisting of rheology modifiers, salts, accelerators and dispersants may be used as additives in surface treatment adhesive to affect other properties of the treated paper and the resultant wallboard. The preferred rheology modifier comprises cellulose ethers. The cellulose ethers of use in the present invention may be selected from the group consisting of carboxymethylcellulose(CMC), hydroxypropylmethylcellulose (HPMC), methylcellulose(MC), hydroxypropylcellulose(HPC), hydrophobically modified hydroxypropylcellulose(HM-HPC), hydroxyethylcellulose(HEC), ethyl hydroxyethylcellulose (EHEC), hydrophobically modified hydroxyethylcellulose(HMHEC), cationic hydrophobically modified hydroxyethylcellulose(cationic HMHEC), and anionic hydrophobically modified hydroxyethylcellulose (anionic HMHEC). The preferred cellulose ether comprises hydroxyethylcellulose.

The rheology modifier may also comprise biopolymers. The preferred biopolymer comprises xanthan gum.

One aspect of the invention is that surface treatment adhesive, when it contains the mineral filler as well as the rheology modifier, results in fluid mixtures having high levels of mineral filler. A high level of mineral filler is a level of mineral filler about 20% by weight or more, preferably about 30% by weight of the surface treatment adhesive. The preferred rheology modifier is HEC. Another preferred rheology modifier is xanthan gum. Still more preferred is a rheology modifier comprising a mixture of HEC and xanthan gum.

To produce the surface treatment adhesive with a high level of mineral filler, a quantity of water is first mixed with a small amount of a rheology modifier and stirred to dissolve. Once the rheology modifier is dissolved in the water, the high level of mineral filler is gradually added to the aqueous solution containing the rheology modifier in stages with high speed mixing. The viscosity of the aqueous mixture containing the mineral filler is sheer thinned after each stage in order to control the viscosity of the mixture. Finally, an amount of the latex binder is added to the mixture. A fluid stable mixture is obtained.

An alternative method to produce the surface treatment adhesive is to mix the quantity of water with the latex binder followed by gradual addition of the mineral filler and finally add in the rheology modifier(s).

In practice, the surface treatment adhesive composition described above is diluted with water to a working concentration of from about 2-20% solids by weight then this mixture is applied to a surface of the paper by any of the mechanical processes typically used in the art of paper conversion, including, but not limited to, using a doctor blade, using a roll, using a puddle applicator, or using of a spray applicator. The surface treatment adhesive composition is applied to both interior surfaces of paper employed in wallboard manufacture and preferentially dried in place, although this is not required, producing a paper with a surface-treated side. The amount of surface treatment adhesive used to treat the paper is of a level of greater than about 0.1 $g/m^2$, preferably in the range of greater than about 0.1 $g/m^2$ to 4 $g/m^2$, preferably about 0.1 to 2 $g/m^2$ more preferably about 0.5 to 1 $g/m^2$, still more preferably in the range of about 0.2 to 0.5 $g/m^2$. By applying the surface treatment adhesive composition as a coating in this range, the surface treatment adhesive composition promotes an adhesion affinity of the surface-treated paper layers to the plaster inner core of the wallboard in the case where the plaster either contains no starch at all or a reduced quantity of starch compared to standard practice.

It is preferred that the surface treatment adhesive have minimal effects on the porosity of the paper when producing a paper with a surface-treated side. This preservation of the paper porosity is of utility in the production of wallboard since after wet plaster is applied to the treated surface of the paper with a surface-treated side, water found at this surface may readily evaporate through the paper layers. The porosity property of paper can be measured by means of a standard test method termed "Gurley porosity" involving Hagerty Porosimeter apparatus at a "low" setting. A typical Gurley porosity measurement of the surface-treated paper of the present invention will be on the order of less than 20 seconds difference vs. control non-treated wallboard paper. If a one step continuous process is desired, the mixture may be applied to the surface of the paper and the wet plaster is then applied to the paper with a surface-treated side.

The paper with a surface-treated side is converted into a wallboard by a mechanical process whereby both sides of a layer of wet plaster are brought into contact with treated surface of the paper with a surface-treated side to create a wallboard composition useful in construction applications. The wet plaster in the present invention case contains either no starch or a reduced quantity of starch compared to the prior art. The wet plaster also generally will optimally contain a reduced level of water compared to standard wallboard plaster preparations. Therefore by replacing all or a proportion of the starch component of the final wallboard composition with the paper with a surface-treated side of the present invention a novel wallboard composition is created.

In the process of producing wallboard, a two-step process is envisioned where the paper with a surface-treated side of the present invention which has been previously produced and dried is subsequently combined with a layer of wet plaster to produce a wallboard. Alternatively, a one step process is also envisioned where the surface treatment adhesive composition is applied to the paper surface and, prior to completely drying the paper surface, wet plaster is applied to the paper with a surface-treated side to produce a wallboard.

The wallboard that is produced through the process of the present invention has several improvements over similar prior art process such as enhanced strength due to the lesser quantity of water employed to prepare the wallboard as well as economic benefits. Thus, this process can be envisioned in a further step to potentially allow the production of significantly lower density wallboard products with acceptable strength dimensions, than is currently possible with existing art technology.

The invention is further demonstrated by the following examples. The examples are presented to illustrate the invention, parts and percentages being by weight, unless otherwise indicated.

EXAMPLES

Comparative Example 1

A quantity of 30 parts by weight of calcium sulfate hemihydrate of water was mixed with 70 parts by weight of water with high shear mixing. Within a period of mixture of five (5) minutes a solid gel was formed, making this composition unsuitable for use as a surface treatment adhesive. This mixture is shown in Table 1 as Composition 1.

Comparative Example 2

A quantity of 5 parts by weight of calcium sulfate hemihydrate was mixed with 80 parts by weight of water with high shear mixing. The mixture was observed to thicken briefly to a very viscous state then redisperse with high shear mixing after about ten (10) minutes. Then an additional quantity of 5 parts by weight of calcium sulfate hemi-hydrate was added with additional high shear mixing. This process was repeated until approximately 20 parts by weight of calcium sulfate hemi-hydrate was added to the water. Thus a means to make a concentrated dispersion of gypsum particles by adding calcium hydrate hemi-hydrate, slowly to water with dispersive mixing was demonstrated. This mixture was very viscous and of limited practical utility and is shown in Table 1 as Composition 2.

Example 1

A quantity of 20 parts by weight of Airflex® 526 BP ethylene vinyl acetate latex (available from Air Products and Chemicals, Inc.) was mixed with 80 parts by weight of water. A fluid stable dispersion was obtained. This mixture is shown in Table 1 as Composition 3.

Example 2

A quantity of 49.8 parts by weight of water was mixed with 0.2 parts by weight of Natrosol® 250H4BXR hydroxyethylcellulose (available from Hercules Incorporated) and stirred to dissolve. Once the hydroxyethylcellulose (HEC) was dissolved in the water, 30 parts by weight of calcium sulfate hemihydrate (gypsum) was added gradually and in stages with high speed mixing. Viscosity was relatively high when each successive portion of the gypsum was initially added to the HEC aqueous solution but this mixture was shear thinning with time and so was considered to be a controllable process. Finally, 20 parts by weight of Airflex® 526 BP ethylene vinyl acetate latex (available from Air Products and Chemicals, Inc.) was added to the mixture. A fluid stable mixture was obtained. This process demonstrated that a highly concentrated dispersion of gypsum particles can be obtained by adding calcium sulfate hemi hydrate to water containing an HEC component. This composition is shown in Table 1 as Composition 4.

Example 3

A quantity of 20 parts of Airflex® 526 BP ethylene vinyl acetate latex (available from Air Products and Chemicals, Inc.) was added to 49.7 parts of water then 30 parts by weight of calcium sulfate hemi hydrate was added gradually and in stages with high speed mixing. Only a slight viscosity rise was observed with each successive calcium hemi hydrate addition making this method a very easily controlled process. After all of the calcium sulfate hemihydrate was added, 0.1 parts by weight of Natrosol® 250H4BXR HEC (available from Hercules Incorporated) and 0.2 parts of Keltrol® RD xanthan gum (available from CP Kelco Inc.) are added and dissolved in the mixture as stabilizers for the gypsum slurry as the last components of the batch. In this case, the viscosity of the product was measured to be 1000 cps Brookflield viscosity and there is no settling of the fluid slurry observed after 24 hours. This composition is shown in Table 1 as Composition 5.

TABLE 1

Surface Treatment Adhesive Compositions

| INGREDIENTS | Composition 1 Parts by weight | Composition 2 Parts by weight | Composition 3 Parts by weight | Composition 4 Parts by weight | Composition 5 Parts by weight |
|---|---|---|---|---|---|
| Water | 70 | 80 | 80 | 49.8 | 49.7 |
| Airflex ® 526BP polyethylene polyvinyl acetate latex | | | 20 | 20 | 20 |
| Calcium sulfate hemihydrate | 30 | 20 | | 30 | 30 |
| Natrosol ® 250H4BXR HEC | | | | 0.2 | 0.1 |
| Keltrol ® RD xanthan gum | | | | | 0.2 |
| Observations | Solid gel forms | Viscous mixture settles rapidly to dense cake | Fluid mixture | Mixture settles gradually | Stable fluid suspension 1000 cps viscosity |

Example 4

Standard wallboard paper is surface-treated with a variety of water-based based mixtures then the wet paper surface is dried under direct IR lamp. The list of surface treatments employed is described in Table 1 compositions 2-5. Two control conditions were also tested including a) no surface treatment of the paper surface and b) treatment of the paper surface with water only. The surface-treated treated paper samples treated with the compositions from Table 1 were then contacted with wet plaster containing no starch using the following procedure.
  1) Dilute compositions from Table 1 to active level indicated below with water;
  2) Apply diluted compositions to paper surface with a Gardco drawdown apparatus (available from Paul N. Gardner Company, Inc.), dry by heat lamp to produce a paper with a surface-treated side;
  3) A standard dry plaster, without starch added, was added in a quantity of 60 parts by weight to 30 parts by weight of water then hand-mixed by rod stirrer for 30 seconds;
  4) The wet mix of step 3 was immediately troweled into a plastic mold ¼" (0.6 cm) in depth and leveled by hand tool to form a smooth exposed surface;
  5) The wet outer surface of the plaster in the mold was immediately applied to the paper with a surface-treated side sample;
  6) The paper and mold were placed in a 60° C. oven and dried to constant weight over 16 hours;

7) The paper/plaster mold samples were removed from the oven and were manually separated from each other. The relative area of the paper layer adhered to the plaster mold was quantatively estimated. In this manner, an estimate of the percentage of surface coverage of paper fibers visibly adhering to plaster mold surface was recorded.

TABLE 2

Bond areas of surface-treated paper samples with plaster

| Paper Surface treatment ingredients: | None (Control) | Water only | Composition 2 Comp. Ex. 2 | Composition 3 Example 1 | Composition 4 Example 2 | Composition 5 Example 3 |
|---|---|---|---|---|---|---|
| Active Solids level After dilution | | — | 5% | 2% | 12.5% | 6% |
| Approximate coating weight applied to paper surface | | | 0.5 g/m² | 0.2 g/m² | 1.0 g/m² | 0.6 g/m² |
| Paper % adherence by area to plaster mold after drying: | No bond | No bond | <10% bond area | ~50% bond area | ~90% bond area | ~90% bond area |
| Treated paper Gurley porosity | 57 secs | 57 secs | ND | 57 secs | 58 secs | ND |

It was found in the control case in which there was no surface treatment of the paper that no appreciable bond between the paper and the plaster was achieved. In the second control case where water alone was employed to coat the surface of the paper, no bond with the plaster was observed.

In Example 4 in which latex alone was employed to treat the paper surface, it was found that a moderately strong bond was observed to form to the paper surface. Thus, the use of latex alone as the paper surface treatment is a variation of the process of the present invention that, while not optimal, is still operational.

In Example 4, it was found that where a paper with a surface-treated side where a dispersion of latex and gypsum particles was employed as the surface treatment adhesive a strong complete bond was attained between the paper and the gypsum plaster.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed:

1. A wallboard comprising:
an interior gypsum plaster core; and
at least one treated paper adhered to a surface of the interior gypsum plaster core,
wherein the treated paper further comprises a paper sheet, a surface of the paper sheet is treated with a surface treating adhesive, the surface treating adhesive comprises water, a latex binder and a mineral filler, the latex binder is selected from the group consisting of ethylene polyvinyl acetate, poly (vinyl acetate) (PVOAc) latex, styrene butadiene (SBR), acrylic, and vinyl acrylic, the latex binder comprises about 1-55 wt % of the surface treating adhesive and the mineral filler comprises about 1-50 wt % of the surface treatment adhesive, and wherein the surface of the interior gypsum plaster core is adhered to the surface of the paper sheet treated with the surface treating adhesive.

2. The wallboard of claim 1, wherein the latex binder comprises ethylene polyvinyl acetate latex.

3. The wallboard of claim 1, wherein the mineral filler is selected from the group consisting of calcium sulfate hemi hydrate, calcium sulfate dihydrate, ground gypsum, Portland cement, calcium carbonate, clays, and powdered silica.

4. The wallboard of claim 3, wherein the mineral filler comprises calcium sulfate hemi hydrate.

5. The wallboard of claim 1, wherein the surface treating adhesive further comprises a water-soluble species selected from the group consisting of rheology modifiers, salts, accelerators and dispersants.

6. The wallboard of claim 5, wherein the rheology modifier comprises a cellulose ether.

7. The wallboard of claim 6, wherein the cellulose ether is selected from the group consisting of carboxymethylcellulose(CMC), hydroxypropylmethylcellulose (HPMC), methylcellulose(MC), hydroxypropylcellulose(HPC), hydrophobically modified hydroxypropylcellulose(HMHPC), hydroxyethylcellulose(HEC), ethyl hydroxyethylcellulose (EHEC), hydrophobically modified hydroxyethylcellulose (HMHEC), cationic hydrophobically modified hydroxyethylcellulose(cationic HMHEC), and anionic hydrophobically modified hydroxyethylcellulose (anionic HMHEC).

8. The wallboard of claim 7, wherein the cellulose ether comprises hydroxyethylcellulose(HEC).

9. The wallboard of claim 5, wherein the rheology modifier comprises xanthan gum.

10. The wallboard of claim 1, wherein the amount of the surface treatment adhesive used to treat the paper is of a level of greater than about 0.1 g/m².

11. The wallboard of claim 10, wherein the amount of the surface treatment adhesive used to treat the paper is in the range of greater than about 0.1 g/m² to about 4 g/m².

12. The wallboard of claim 1, wherein the surface-treated paper has a Gurley porosity measurement of less than 20 seconds difference when compared to a the paper sheet without the surface treating adhesive using a Hagerty Porosimeter apparatus at a "low" setting.

13. The wallboard of claim 1, wherein the latex binder comprises poly(vinyl acetate) (PVOAc) latex.

14. The wallboard of claim 11, wherein the amount of the surface treatment adhesive used to treat the paper is in the range of about 0.1 to about 2 g/m².

15. The wallboard of claim 14, wherein the amount of the surface treatment adhesive used to treat the paper is in the range of about 0.5 to about 1 g/m².

* * * * *